United States Patent
Kurihara et al.

(10) Patent No.: US 10,384,880 B2
(45) Date of Patent: Aug. 20, 2019

(54) WORKPIECE SUPPLY SYSTEM

(71) Applicant: FANUC CORPORATION, Yamanashi (JP)

(72) Inventors: Yuusuke Kurihara, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/983,535

(22) Filed: May 18, 2018

(65) Prior Publication Data

US 2018/0346256 A1     Dec. 6, 2018

(30) Foreign Application Priority Data

May 30, 2017   (JP) ................................. 2017-106739

(51) Int. Cl.
| | |
|---|---|
| *B65G 43/00* | (2006.01) |
| *B65G 47/90* | (2006.01) |
| *G08B 21/02* | (2006.01) |
| *G08B 21/06* | (2006.01) |
| *B25J 9/16* | (2006.01) |
| *B25J 19/06* | (2006.01) |
| *G05B 19/042* | (2006.01) |

(52) U.S. Cl.
CPC ............ *B65G 43/00* (2013.01); *B25J 9/1674* (2013.01); *B25J 9/1694* (2013.01); *B25J 19/06* (2013.01); *B65G 47/905* (2013.01); *G08B 21/02* (2013.01); *G08B 21/06* (2013.01); *G05B 19/0426* (2013.01); *G05B 2219/32358* (2013.01); *G05B 2219/40202* (2013.01); *Y10S 901/46* (2013.01)

(58) Field of Classification Search
CPC ................................. G08B 21/02; G08B 21/06
See application file for complete search history.

(56) References Cited

U.S. PATENT DOCUMENTS

| | | | | |
|---|---|---|---|---|
| 2006/0217841 A1* | 9/2006 | Matsumoto | ............ | B25J 9/1669 700/248 |
| 2015/0206090 A1* | 7/2015 | Pakhchanyan | ...... | G06F 3/04895 705/7.42 |
| 2016/0110983 A1* | 4/2016 | Gandhi | .................. | G08B 21/02 340/573.1 |
| 2016/0137059 A1* | 5/2016 | Mader | .................. | B60K 28/066 340/575 |
| 2018/0027218 A1* | 1/2018 | Kiso | .................... | H04N 9/3179 705/7.14 |

FOREIGN PATENT DOCUMENTS

| | | |
|---|---|---|
| JP | 2007-072754 | 3/2007 |
| JP | 2011-227773 | 11/2011 |
| JP | 2014-142814 | 8/2014 |

* cited by examiner

*Primary Examiner* — Thomas Randazzo
(74) *Attorney, Agent, or Firm* — Karceski IP Law, PLLC (57) ABSTRACT

A workpiece supply system includes a robot that supplies a workpiece to each of a plurality of workspaces where a worker performs a predetermined task on the workpiece; a detection unit that detects a degree of fatigue of the worker in each of the workspaces; a fatigue degree evaluation unit that determines whether or not the worker is in a fatigued state, based on the degree of fatigue of the worker detected by the detection unit; and a management device that adjusts, among a plurality of workers, a pace of supply of the workpiece to each of the workers, in a case where the worker is determined by the fatigue degree evaluation unit to be in the fatigued state.

10 Claims, 5 Drawing Sheets

WORKPIECE SUPPLY SYSTEM

CROSS-REFERENCE TO RELATED APPLICATIONS

This application claims priority to and claims the benefit of Japanese Patent Application No. 2017-106739, filed on May 30, 2017, the entire content of which is incorporated herein by reference.

FIELD OF THE INVENTION

The present invention relates to a workpiece supply system.

BACKGROUND OF THE INVENTION

There have been occasions where a robot and a worker perform a task in collaboration. For example, such occasions include a case where a robot conveys a heavy workpiece and transfers the workpiece to a worker, and the worker performs a predetermined task on the workpiece received from the robot.

In the case of performing a task in such a manner, the robot is often programmed to transfer workpieces to the worker one after the other every time a specific period of time (interval time) passes. However, the work efficiency may be reduced as the time passes due to fatigue of the worker, for example, and it may become difficult for the worker to move following the operation of the robot performed every specific period of time. This results in a shift (delay) between the operation of the robot and movement of the worker, and may result in reduction in the production efficiency and the like.

With respect to the above, a configuration is proposed according to which the robot performs a part of the task which is supposed to be performed by the worker, instead of the worker, when the work efficiency of the worker is reduced.

For example, there is known a production system having a configuration according to which a time taken by a worker to perform a predetermined task is measured, and the proportion of assignment of the task between the worker and the robot is changed according to the measured time (for example, see Japanese Unexamined Patent Application, Publication No. 2011-227773). According to this configuration, when the time taken by a worker to perform a predetermined task reaches or becomes longer than a specified time, a part of the task which is supposed to be performed by the worker is performed by the robot instead, and reduction in the production efficiency is thereby prevented.

Moreover, there is known a production system having a configuration according to which the degree of vacancy in an installation location of workpieces which are supplied by a robot is detected, and the robot performs a part of the task to be performed by a worker when the detected degree of vacancy falls to or below a predetermined level (for example, see Japanese Unexamined Patent Application, Publication No. 2014-142814). Also according to such a configuration, when the work efficiency of the worker is reduced, a part of the task which is supposed to be performed by the worker is performed by the robot instead, and reduction in the production efficiency is thereby prevented.

SUMMARY OF THE INVENTION

An aspect of the present invention provides a workpiece supply system including a robot that supplies a workpiece to each of a plurality of workspaces where a worker performs a predetermined task on the workpiece, a detection unit that detects a degree of fatigue of the worker in each of the workspaces, a determination unit that determines whether or not the worker is in a fatigued state, based on the degree of fatigue of the worker detected by the detection unit, and an adjustment control unit that adjusts, among the plurality of workspaces, a pace of supply of the workpiece to each of the workspaces by the robot, in a case where the worker is determined by the determination unit to be in the fatigued state.

DESCRIPTION OF EMBODIMENT(S) OF THE INVENTION

A workpiece supply system 1 according to an embodiment of the present invention will be described below with reference to the drawings.

Figure 1:
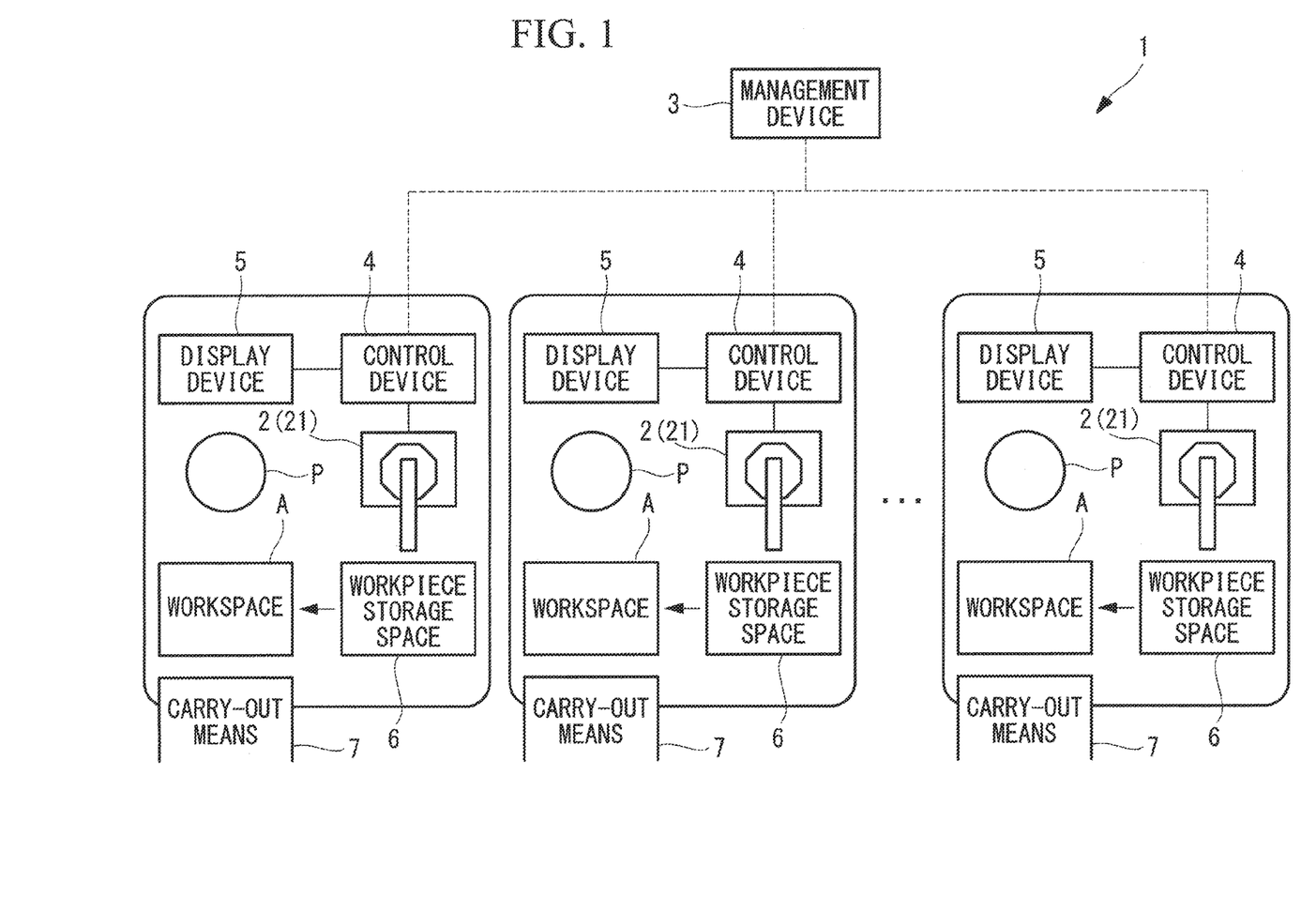
FIG. 1 is a schematic diagram showing an overall configuration of a workpiece supply system according to an embodiment of the present invention.
Figure 2:
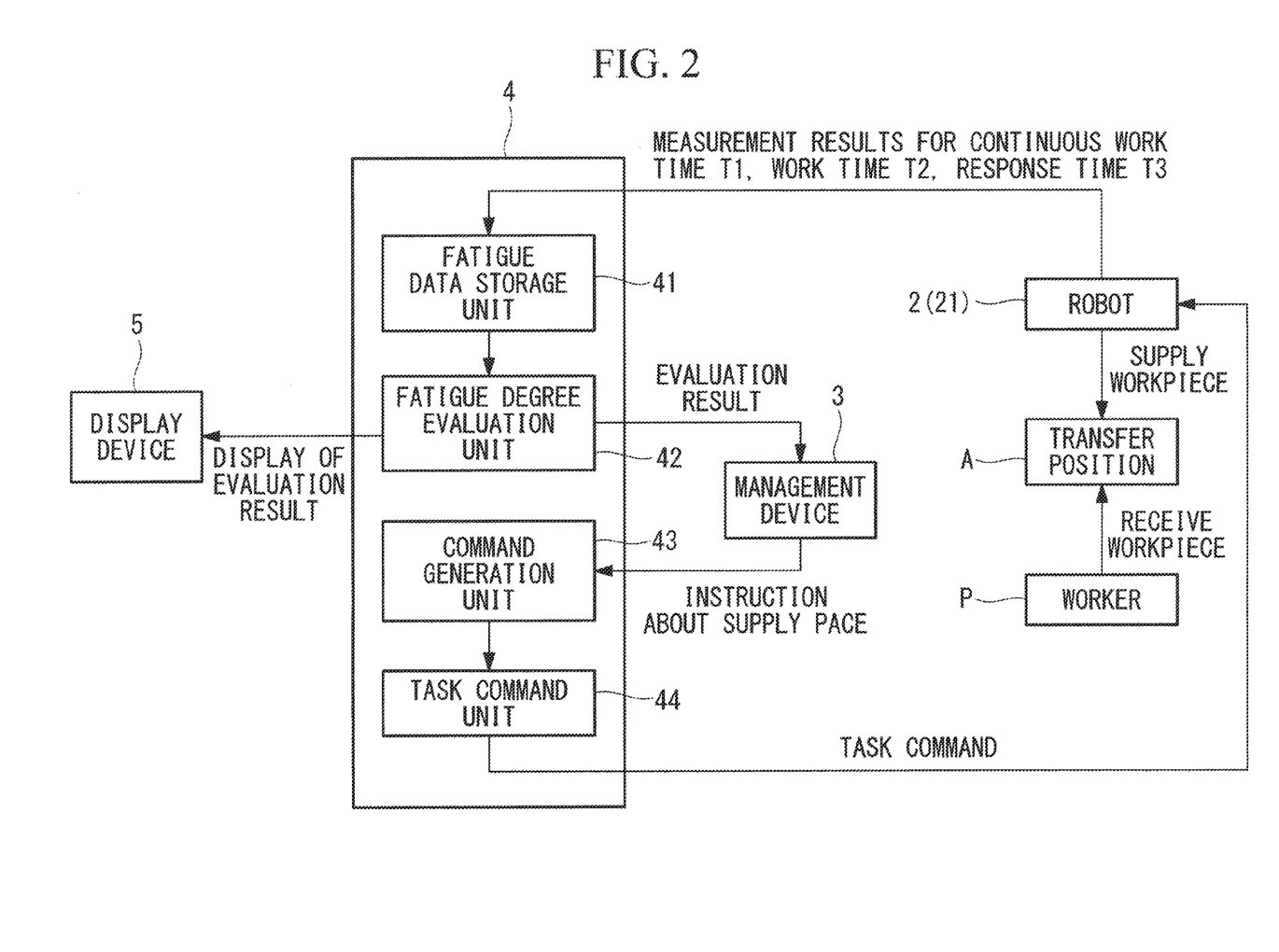
FIG. 2 is a block diagram showing a functional configuration of the workpiece supply system in FIG. 1.

FIG. 1 is a schematic diagram showing an overall configuration of the workpiece supply system 1 according to the embodiment of the present invention. FIG. 2 is a block diagram showing a functional configuration of the workpiece supply system 1 in FIG. 1.

As shown in FIG. 1, the workpiece supply system 1 according to the present embodiment mainly includes a plurality of robots 2, control devices 4 that controls operation of the respective robots 2, display devices (output units) 5, and a management device (adjustment control unit) 3 that adjusts operation among the plurality of robots 2.

With the workpiece supply system 1, one robot 2 is arranged in each of a plurality of workspaces (transfer positions) A. A worker P performs a predetermined task on a workpiece in each workspace A.

In the embodiment, a predetermined task to be performed by the worker P on a workpiece may be assembling of a workpiece supplied by the robot 2 to a workpiece assembly target, for example. Furthermore, the worker P may perform a task of assembling various parts and the like to a workpiece supplied by the robot 2, for example. After a predetermined task is performed by the worker P, the workpiece is conveyed out of the workspace A by a carry-out means 7, such as a conveyor belt, an automatic guided vehicle, or an outlet chute.

Each robot 2 supplies workpieces, which are stocked in plurality in a workpiece storage space 6, to each workspace A. A specific structure or form of the robot 2 is not limited as long as the robot 2 is capable of supplying a workpiece to the workspace A. Furthermore, workpieces, which are to be supplied by the robot 2, are conveyed into and stocked in the workpiece storage space 6 by a carry-in means, not shown, such as a conveyor belt.

Each robot 2 includes a detection unit 21 that detects the degree of fatigue of the worker P in the respective workspace A. For example, the detection unit 21 measures, as parameters for detecting the degree of fatigue, a continuous work time T1 from when the worker P starts to perform a task in the workspace A, a work time T2 taken by a predetermined task, and a response time T3 from when a workpiece is supplied to the workspace A by the robot 2 to when the worker P starts the predetermined task. For this purpose, the robot 2 includes a sensor, a switch and the like for detecting start and end of a predetermined task.

The detection unit 21 outputs the measured continuous work time T1, work time T2, and response time T3 to the control device 4 as detection data related to the degree of fatigue.

The control device 4 is provided for each of the robots 2, which are arranged one in each of a plurality of workspaces A. As shown in FIG. 2, each control device 4 includes a fatigue data storage unit 41, a fatigue degree evaluation unit (determination unit) 42, a command generation unit 43, and a task command unit 44.

The fatigue data storage unit 41 stores, as measurement data related to the degree of fatigue, measurement results for the continuous work time T1, the work time T2, and the response time T3 output from the detection unit 21 of the robot 2.

The fatigue degree evaluation unit 42 evaluates (determines) whether or not a worker P is in a fatigued state, based on the degree of fatigue of the worker P detected by the detection unit 21. The fatigue degree evaluation unit 42 outputs an evaluation result indicating whether the worker P is in a fatigued state or not to the management device 3. As described later, the management device 3 adjusts a pace of supply of workpieces by the robot 2, based on the evaluation result output from the fatigue degree evaluation unit 42.

The command generation unit 43 generates a command for the robot 2 according to an instruction value regarding the pace of supply of workpieces by the robot 2 generated by the management device 3 based on the evaluation result output by the fatigue degree evaluation unit 42.

The task command unit 44 outputs the command generated by the command generation unit 43 to the robot 2.

The display device 5 outputs information about the degree of fatigue. In this case, if the worker P is determined to be in a fatigued state, the display device 5 outputs, as the information about the degree of fatigue, a message recommending the worker P to take a break or to be switched. The worker P or a manager managing the plurality of workspaces A may thereby check the fatigued state of the worker P. Accordingly, the manager may check that there is a worker P whose degree of fatigue is high, and may make the worker P take a break or be switched, for example.

The management device 3 adjusts the pace of supply of workpieces among a plurality of robots 2 in a case where at least one of a plurality of workers P performing tasks in the plurality of workspaces A is determined by the fatigue degree evaluation unit 42 to be in a fatigued state.

Specifically, in a case where a worker P is determined to be in a fatigued state, the management device 3 causes the pace of supply of workpieces to be reduced at the robot 2 supplying workpieces to the workspace A of the worker P in question. Furthermore, in a case where a worker P is determined to be in a fatigued state, the management device 3 causes the pace of supply of workpieces to be increased at another robot 2 supplying workpieces to the workspace A of another worker P who is not determined to be in a fatigued state.

Next, a description will be given of a control method of each unit of the workpiece supply system 1 described above.

Figure 3:
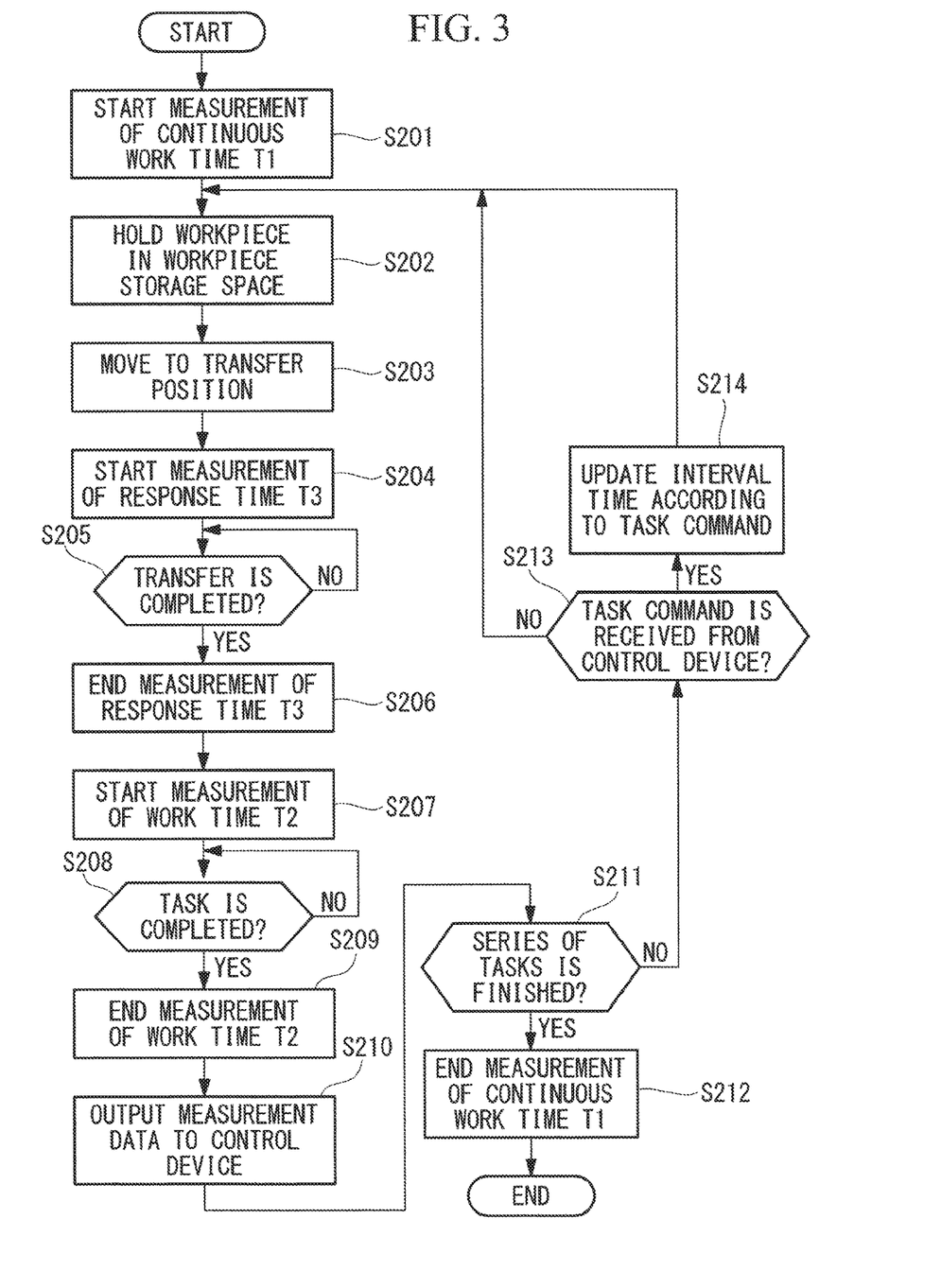
FIG. 3 is a flowchart showing a flow of processing for detecting the degree of fatigue of a worker during operation at each robot of the workpiece supply system in FIG. 1.

FIG. 3 is a flowchart showing a flow of processing for detecting the degree of fatigue of a worker P during operation at each robot 2 of the workpiece supply system 1 in FIG. 1.

As shown in FIG. 3, at each robot 2, when a worker P in charge of a workspace A starts a series of continuous tasks by operating the robot 2, the detection unit 21 starts to measure the continuous work time T1 (step S201).

After the continuous tasks are started, the robot 2 holds a workpiece which is stocked in the workpiece storage space 6 (step S202).

Next, the robot 2 moves to a predetermined transfer position in the workspace A while holding the workpiece, and waits for reception by the worker P (step S203).

When the robot 2 has moved to the transfer position while holding a workpiece, the detection unit 21 starts measurement of the response time T3 (step S204). The worker P receives the workpiece from the robot 2 when he/she is ready to start a predetermined task. For example, detection by a predetermined sensor, operation of a switch, or the like is performed based on movement of the worker P. The robot 2 then starts an operation of transferring the workpiece to the worker P.

Here, the robot 2 may transfer the workpiece to the worker P by releasing the holding of the workpiece, or may set the workpiece at a predetermined position in the workspace A. Moreover, the robot 2 may transfer the workpiece by moving the workpiece to a position where the worker P performs a predetermined task, while continuing to hold the workpiece.

The detection unit 21 of the robot 2 checks whether or not transfer of the workpiece is completed (step S205), and ends measurement of the response time T3 upon completion of transfer (step S206).

The detection unit 21 then starts measurement of the work time T2 (step S207). When transfer of the workpiece is completed, the worker P starts a predetermined task.

When the worker P has finished performing the predetermined task on the workpiece, detection by a predetermined sensor, operation of a switch, or the like is performed, and a predetermined signal is output to the detection unit 21. The detection unit 21 is waiting for input of a signal indicating completion of the task (step S208), and ends measurement of the work time T2 upon input of the signal (step S209).

In this manner, when a predetermined task on one workpiece is completed, the detection unit 21 then outputs, to the control device 4, measurement data about the response time T3 and the work time T2 obtained in steps S206, S209, and measurement data about the continuous work time T1 at the time point (step S210).

Then, the robot 2 determines whether or not the series of continuous tasks is finished (step S211), and in the case where the series of continuous tasks is finished, measurement of the continuous work time T1 is ended (step S212), and operation is ended.

Unless the series of continuous tasks is finished in step S211, the robot 2 keeps returning to step S202 and repeats the series of processes every time a predetermined interval time passes, where the predetermined interval time is according to a set value for the pace of supply of workpieces set in the robot 2. If a command is received from the control device 4 (step S213) before the lapse of the predetermined interval time, the interval time which is set in the robot 2 at the time point is updated to an interval time according to the pace of supply of workpieces included in the command from the control device 4 (step S214).

Figure 4:
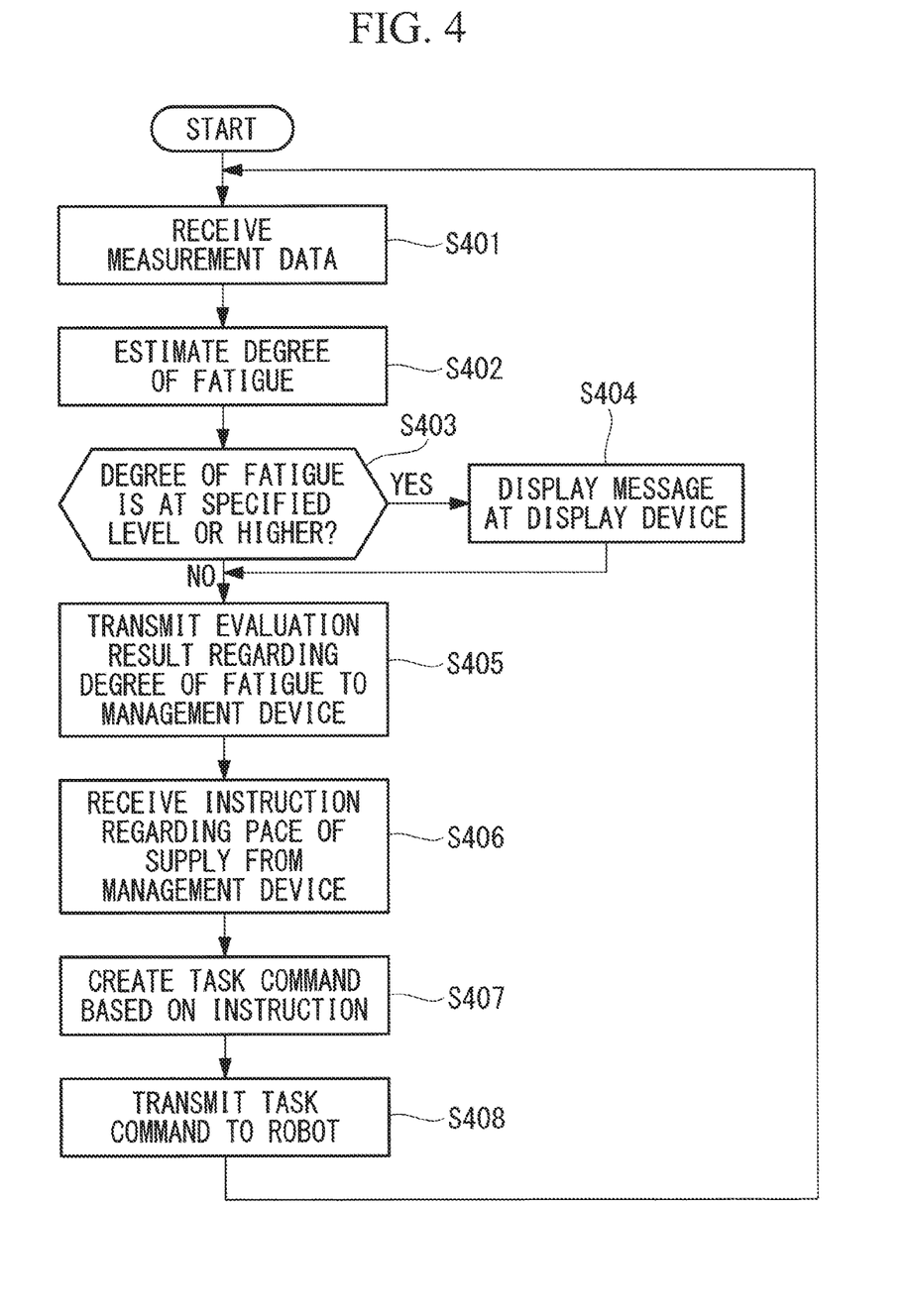
FIG. 4 is a flowchart showing a flow of processing for estimating the degree of fatigue of a worker at a control device of the workpiece supply system in FIG. 1.

FIG. 4 is a flowchart showing a flow of processing for estimating the degree of fatigue of a worker P at the control device 4 of the workpiece supply system 1 in FIG. 1.

As shown in FIG. 4, the control device 4 receives the measurement data about the continuous work time T1, the response time T3, and the work time T2 output from the detection unit 21 of the robot 2 in step S210 described above (step S401). The control device 4 stores the received measurement data in the fatigue data storage unit 41.

Next, the fatigue degree evaluation unit 42 of the control device 4 estimates the degree of fatigue of the worker P based on the measurement data stored in the fatigue data storage unit 41 (step S402). For example, the degree of fatigue is estimated to be high if the continuous work time T1 is equal to or longer than a specified time determined in advance. Moreover, if the response time T3 is equal to or longer than a time determined in advance, it is estimated that the worker P is not following the pace of supply by the robot 2, and that the degree of fatigue is high. Moreover, if the work time T2 required to perform a predetermined task is equal to or longer than a specified time determined in advance, the degree of fatigue can be estimated to be high.

Furthermore, the fatigue degree evaluation unit 42 may estimate the degree of fatigue of the worker P based on a change in the work time T2. For this purpose, the initial work time T2 which was taken by the predetermined task and which was detected first (at the beginning) by the detection unit 21 when the worker P started the series of continuous tasks in the workspace A is stored in the fatigue data storage unit 41. Then, in step S402, the fatigue degree evaluation unit 42 may estimate that the degree of fatigue is high, in the case where the latest work time T2 becomes longer than the initial work time T2 to an extent determined in advance.

The fatigue degree evaluation unit 42 performs estimation, for example, by quantifying the degree of fatigue of the worker P based on the parameters as described above.

Next, the fatigue degree evaluation unit 42 determines whether or not the degree of fatigue of the worker P estimated in step S402 is a fatigued state at a specified level determined in advance or higher (step S403).

If, according to the result, the degree of fatigue of the worker P is a fatigued state at a specified level or higher, the control device 4 outputs information about the degree of fatigue of the worker P to the display device 5. Specifically, the control device 4 causes the display device 5 to output a message recommending the worker P to take a break or to be switched (step S404).

Then, the control device 4 transmits an evaluation result of step S403 regarding the degree of fatigue of the worker P to the management device 3 (step S405).

As will be described later in detail, the management device 3 generates an instruction including setting information about the pace of supply of workpieces by the robot 2 (or more specifically, the interval time), based on the evaluation result regarding the degree of fatigue transmitted from the control device 4, and transmits the instruction to the control device 4.

When the instruction regarding the pace of supply is received from the management device 3 (step S406), the control device 4 creates a task command for the robot 2 based on the contents of the instruction (step S407). Moreover, the control device 4 transmits the created task command to the robot 2 (step S408).

The task command transmitted from the control device 4 is received by the robot 2 in step S213 shown in FIG. 3.

Figure 5:
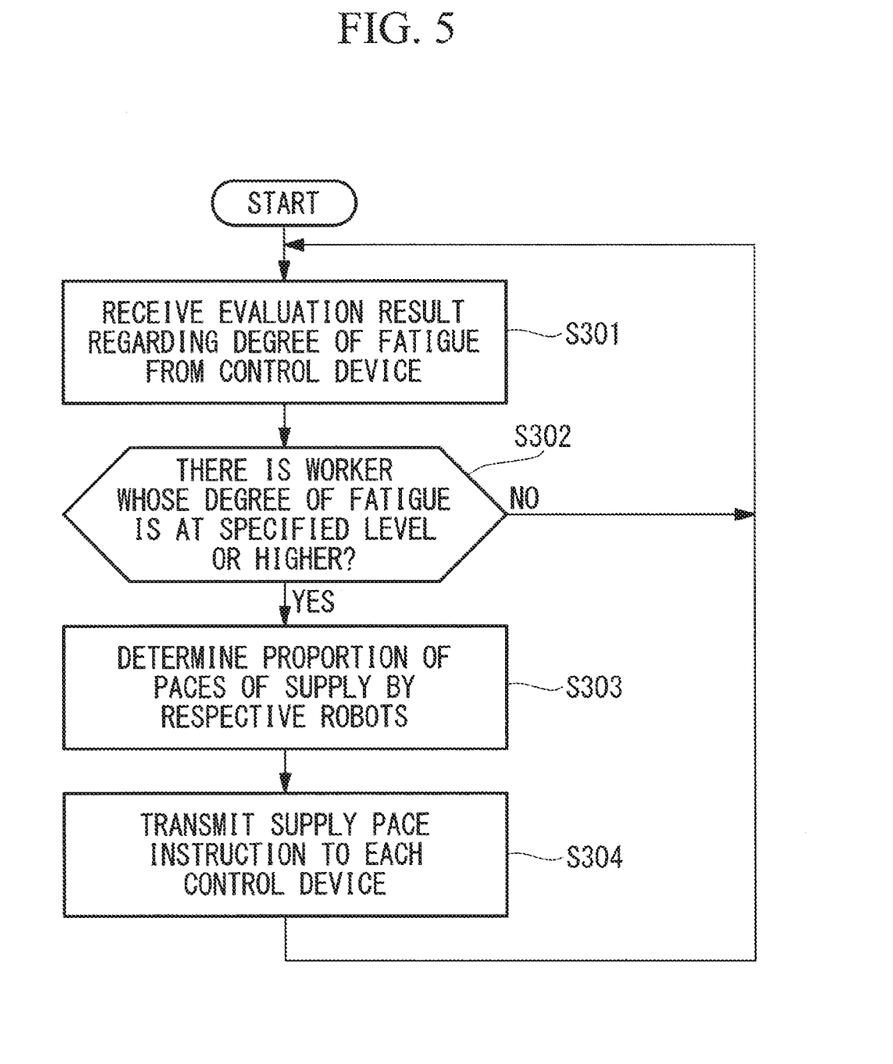
FIG. 5 is a flowchart showing a flow of processing, at a management device of the workpiece supply system in FIG. 1, for adjusting the pace of supply of workpieces among a plurality of robots according to the degree of fatigue of a worker collaborating with each robot.

FIG. 5 is a flowchart showing a flow of processing, at the management device 3 of the workpiece supply system 1 in FIG. 1, for adjusting the pace of supply of workpieces among a plurality of robots 2 according to the degree of fatigue of a worker P collaborating with each robot 2.

As shown in FIG. 5, when evaluation results regarding the degree of fatigue of workers P transmitted from the control devices 4 in step S405 in FIG. 4 are received (step S301), the management device 3 determines whether or not there is a worker P whose degree of fatigue is at a specified level determined in advance or higher (step S302).

If there is no worker P whose degree of fatigue is at a specified level or higher, there is no need to adjust the pace of supply of workpieces at each robot 2, and thus, step S301 is performed again to wait for reception of other evaluation results.

On the other hand, if, in step S302, there is a worker P whose degree of fatigue is at a specified level or higher, the management device 3 determines the proportion of the paces of supply of workpieces by the robots 2 in the plurality of workspaces A (step S303). That is, in the case where a worker P is determined by the fatigue degree evaluation unit 42 to be in a fatigued state, the management device 3 adjusts, among the plurality of workspaces A, the paces of supply of workpieces (interval times) to the respective workspaces A by the robots 2. Specifically, the pace of supply of workpieces is reduced (the interval time is increased) for the robot 2 which supplies workpieces to the workspace A of a worker P whose degree of fatigue is at or higher than a specified level and who is determined to be in a fatigued state. Moreover, the pace of supply of workpieces is increased (the interval time is reduced) for another robot 2 which supplies workpieces to the workspace A of another worker P who is not determined to be in a fatigued state. The degree of reduction in the pace of supply of workpieces, and the degree of increase in the pace of supply of workpieces may be set as appropriate. For example, the degree of fatigue may be divided into stages, and the pace of supply of workpieces may be greatly reduced as the degree of fatigue becomes higher, and the pace of supply of workpieces may be greatly increased as the degree of fatigue becomes lower.

When the setting information about the pace of supply of workpieces is determined in the above manner for each of the plurality of robots 2, a supply pace instruction including the determined setting information about the pace of supply of workpieces is transmitted to the control device 4 of each robot 2 based on the determined contents (step S304).

Due to the above-described processing by the robot 2, the control device 4, and the management device 3, when the degree of fatigue of a worker P in one of the workspaces A where the workpiece supply system 1 is disposed is increased, the pace of supply by the robot 2 for the worker P with a high degree of fatigue is reduced, and the pace of supply by the robot 2 for a worker P with a low degree of fatigue is increased.

Moreover, in the case where a worker P with a high degree of fatigue has taken a break and has recovered from fatigue, or a worker P with a high degree of fatigue is switched by another worker, the management device 3 may cause each control device 4 to return the pace of supply of workpieces by the robot 2 to a standard value determined in advance.

As described above, with the workpiece supply system 1 according to the present embodiment, in a case where a worker P is determined by the fatigue degree evaluation unit 42 to be in a fatigued state, the management device 3 adjusts the pace of supply of workpieces to each workspace A, among the robots 2 for a plurality of workspaces A. Accordingly, for example, the degree of fatigue of a worker P who is in a fatigued state may be prevented from being increased, by reducing the pace of supply of workpieces to the worker P in question, and the production efficiency may be prevented from being further reduced. Furthermore, for example, by increasing the pace of supply of workpieces to a worker P who is not in a fatigued state, the production efficiency of the plurality of workspaces A as a whole may be prevented from being reduced.

Accordingly, even with a task which the robot 2 cannot perform instead of the worker P, the robot 2 and the worker P may perform the task in collaboration, and the production efficiency may be prevented from being reduced.

Furthermore, with the workpiece supply system 1 according to the present embodiment, the detection unit 21 detects the degree of fatigue by measuring the work time T2 taken by a predetermined task, and thus, if the work time T2 taken by a worker P to perform the predetermined task is increased, the degree of fatigue of the worker P can be determined to be increasing.

Furthermore, with the workpiece supply system 1 according to the present embodiment, the work time T2 which was taken by a predetermined task at the beginning when a worker P started to perform the task in the workspace A is stored, and when the work time T2 becomes longer than the initial work time T2 to an extent determined in advance, the worker P is determined to be in a fatigued state.

When there is a plurality of workers P, the work time T2 taken to perform a predetermined task may be different for each worker P due to individual differences in skill or the like for the task. Also in such a case, by storing the initial work time T2 for each worker P, a worker P may be determined to be in a fatigued state, when the work time T2 taken by the predetermined task becomes longer than the initial work time T2.

Furthermore, with the workpiece supply system 1 according to the present embodiment, the detection unit 21 detects the degree of fatigue by detecting the continuous work time T1 from the start of a task in the workspace A by the worker P. Therefore, when the continuous work time T1 becomes long, the worker P may be determined to be in a fatigued state. Accordingly, for example, even if the work time T2 taken by a predetermined task is not increased, when the continuous work time T1 becomes long, the worker P may be determined to be in a fatigued state, and the pace of supply of workpieces may be adjusted among a plurality of workspaces A so that an excessive burden is not placed on the worker P.

Furthermore, with the workpiece supply system 1 according to the present embodiment, the detection unit 21 detects the degree of fatigue by detecting the response time T3 from when a workpiece is supplied to the workspace A by the robot 2 to when the worker P starts a predetermined task. Accordingly, if the response time T3 from when a workpiece is supplied to the workspace A by the robot 2 to when the worker P starts a predetermined task is increased, the degree of fatigue of the worker P can be determined to be increasing.

Furthermore, in a case where a worker P is determined to be in a fatigued state, the management device 3 increases the pace of supply of workpieces by another robot 2 which supplies workpieces to the workspace A of another worker P who is not determined to be in a fatigued state. Accordingly, even if the work efficiency is reduced in the workspace A of a worker P who is in a fatigued state, the work efficiency may be increased in the workspace A of another worker P who is not in a fatigued state. Therefore, the work efficiency may be prevented from being reduced for the plurality of workspaces A as a whole.

Furthermore, in the case where a worker P is determined to be in a fatigued state, the management device 3 reduces the pace of supply of workpieces by the robot 2 which supplies workpieces to the workspace A of the worker P in question. Accordingly, the degree of fatigue of the worker P who is determined to be in a fatigued state may be prevented from being further increased. Therefore, the production efficiency may be prevented from being reduced for the plurality of workspaces A as a whole.

Moreover, the display device 5 for outputting information about the degree of fatigue of a worker P detected by the detection unit 21 is further included. Accordingly, a manager managing a plurality of workspaces A or a worker P himself/herself may check the fatigued state of the worker P. The manager may thus check that there is a worker P with a high degree of fatigue, and may make the worker P take a break or be switched, for example.

Furthermore, in a case where a worker P is determined to be in a fatigued state, the display device 5 outputs a message recommending the worker P to take a break or to be switched. Accordingly, a worker P who is in a fatigued state may be made to take a break or to be switched, and the production efficiency may be prevented from being reduced.

Additionally, in the present embodiment, the number of robots 2 and the number of workers P in the workpiece supply system 1 are not specifically limited as long as there are a plurality of robots 2 and workers P.

Moreover, with the workpiece supply system 1 of the present embodiment, the robot 2 and the worker P are made into a pair, and a plurality of pairs of the robot 2 and the worker P are arranged, but one robot 2 may alternatively supply workpieces to a plurality of workers P. Also with such a configuration, the pace of supply of workpieces by the robot 2 may be adjusted, among a plurality of workspaces A, according to the degree of fatigue of a worker P in the manner described above.

From the above-described embodiment, the following invention is derived.

An aspect of the present invention provides a workpiece supply system including a robot that supplies a workpiece to each of a plurality of workspaces where a worker performs a predetermined task on the workpiece, a detection unit that detects a degree of fatigue of the worker in each of the workspaces, a determination unit that determines whether or not the worker is in a fatigued state, based on the degree of fatigue of the worker detected by the detection unit, and an adjustment control unit that adjusts, among the plurality of workspaces, a pace of supply of the workpiece to each of the workspaces by the robot, in a case where the worker is determined by the determination unit to be in the fatigued state.

According to the present aspect, in a case where a worker is determined by the determination unit to be in the fatigued state, the adjustment control unit adjusts the pace of supply of workpieces to each workspace, among the plurality of workspaces. Accordingly, for example, the degree of fatigue of a worker who is in the fatigued state may be prevented from being increased, by reducing the pace of supply of workpieces to the worker in question, and the production efficiency may be prevented from being further reduced. Furthermore, for example, by increasing the pace of supply of workpieces to a worker who is not in the fatigued state, the production efficiency of the plurality of workspaces as a whole may be prevented from being reduced.

In the aspect described above, the robot may be provided in each of the plurality of workspaces, and in a case where the worker is determined by the determination unit to be in the fatigued state, the adjustment control unit may adjust the pace of supply of the workpiece among a plurality of the robots.

Accordingly, in a case where a worker is determined to be in the fatigued state, the adjustment control unit adjusts the pace of supply of workpieces to each workspace, among a plurality of robots provided in respective workspaces.

In the aspect described above, the detection unit may detect the degree of fatigue by measuring a work time taken by the predetermined task.

Accordingly, if the work time taken by a worker to perform the predetermined task is increased, the degree of fatigue of the worker can be determined to be increasing.

Furthermore, in the aspect described above, the determination unit may store an initial work time taken by the predetermined task, the initial work time being detected by the detection unit at a beginning when the worker started to perform a task in the workspace, and the determination unit may determine that the worker is in the fatigued state, when the work time taken by the predetermined task and detected by the detection unit becomes longer than the initial work time to an extent determined in advance.

By storing the initial work time for each worker, a worker may be determined to be in the fatigued state when the work time taken by the predetermined task becomes longer than the initial work time. When there is a plurality of workers, the work time taken by the predetermined task may be different for each worker due to individual differences in skill or the like for the task. Also in such a case, whether a worker is in the fatigued state or not may be determined with a high accuracy for each worker.

Furthermore, in the aspect described above, the detection unit may detect the degree of fatigue by detecting a continuous work time from a start of a task in the workspace by the worker.

When the continuous work time becomes long, the worker may be determined to be in the fatigued state. Accordingly, for example, even if the work time taken by the predetermined task is not increased, when the continuous work time becomes long, the worker may be determined to be in the fatigued state, and the pace of supply of workpieces may be adjusted among a plurality of workspaces so that an excessive burden is not placed on the worker.

Furthermore, in the aspect described above, the detection unit may detect the degree of fatigue by detecting a response time from when the workpiece is supplied to the workspace by the robot to when the worker starts the predetermined task.

If the response time from when a workpiece is supplied to the workspace by the robot to when the worker starts the predetermined task is increased, the degree of fatigue of the worker can be determined to be increasing.

Furthermore, in the aspect described above, in a case where the worker is determined to be in the fatigued state, the adjustment control unit may increase the pace of supply of the workpiece to the workspace of another worker who is not determined to be in the fatigued state.

Even if the work efficiency is reduced in the workspace of a worker who is in the fatigued state, the work efficiency may be increased in the workspace of another worker who is not in the fatigued state. Therefore, the work efficiency may be prevented from being reduced for the plurality of workspaces as a whole.

Furthermore, in the aspect described above, in a case where the worker is determined to be in the fatigued state, the adjustment control unit may reduce the pace of supply of the workpiece to the workspace of the worker in question.

Accordingly, the degree of fatigue of the worker who is determined to be in the fatigued state may be prevented from being further increased. Therefore, the production efficiency may be prevented from being reduced for the plurality of workspaces as a whole.

Furthermore, the aspect described above may further include an output unit that outputs information about the degree of fatigue of the worker detected by the detection unit.

A manager managing a plurality of workspaces is thereby enabled to check the fatigued state of each worker, for example. Accordingly, the manager may check that there is a worker with a high degree of fatigue, and may make the worker take a break or be switched, for example.

Furthermore, in the aspect described above, in a case where the worker is determined to be in the fatigued state, the output unit may output a message recommending the worker to take a break or to be switched.

Accordingly, a worker who is in the fatigued state may be made to take a break or to be switched, and the production efficiency may be prevented from being reduced.

The invention claimed is:

1. A workpiece supply system comprising:
a robot that supplies a workpiece to each of a plurality of workspaces where a worker performs a predetermined task on the workpiece;
a detection unit that detects a degree of fatigue of the worker in each of the workspaces;
a determination unit that determines whether or not the worker is in a fatigued state, based on the degree of fatigue of the worker detected by the detection unit; and
an adjustment control unit that adjusts, among the plurality of workspaces, a pace of supply of the workpiece to each of the workspaces by the robot, in a case where the worker is determined by the determination unit to be in the fatigued state.

2. The workpiece supply system according to claim 1, wherein
the robot is provided in each of the plurality of workspaces, and
in a case where the worker is determined by the determination unit to be in the fatigued state, the adjustment control unit adjusts the pace of supply of the workpiece among a plurality of the robots.

3. The workpiece supply system according to claim 1, wherein the detection unit detects the degree of fatigue by measuring a work time taken by the predetermined task.

4. The workpiece supply system according to claim 3, wherein
the determination unit stores an initial work time taken by the predetermined task, the initial work time being detected by the detection unit at a beginning when the worker started to perform a task in the workspace, and
the determination unit determines that the worker is in the fatigued state, when the work time taken by the predetermined task and detected by the detection unit becomes longer than the initial work time to an extent determined in advance.

5. The workpiece supply system according to claim 1, wherein the detection unit detects the degree of fatigue by detecting a continuous work time from a start of a task in the workspace by the worker.

6. The workpiece supply system according to claim 1, wherein the detection unit detects the degree of fatigue by detecting a response time from when the workpiece is supplied to the workspace by the robot to when the worker starts the predetermined task.

7. The workpiece supply system according to claim 1, wherein, in a case where the worker is determined to be in the fatigued state, the adjustment control unit increases the pace of supply of the workpiece to the workspace of another worker who is not determined to be in the fatigued state.

8. The workpiece supply system according to claim 1, wherein, in a case where the worker is determined to be in the fatigued state, the adjustment control unit reduces the pace of supply of the workpiece to the workspace of the worker in question.

9. The workpiece supply system according to claim 1, further comprising an output unit that outputs information about the degree of fatigue of the worker detected by the detection unit.

10. The workpiece supply system according to claim 9, wherein, in a case where the worker is determined to be in the fatigued state, the output unit outputs a message recommending the worker to take a break or to be switched.

* * * * *